US007529407B2

(12) United States Patent
Marquering et al.

(10) Patent No.: US 7,529,407 B2
(45) Date of Patent: May 5, 2009

(54) SEGMENTING AN IMAGE VIA SHORTEST CYCLES

(75) Inventors: Henricus A. Marquering, Utrecht (NL); Dennis Peeten, Kessel (NL)

(73) Assignee: OCE-Technologies B.V., Venlo (NL)

( * ) Notice: Subject to any disclaimer, the term of this patent is extended or adjusted under 35 U.S.C. 154(b) by 734 days.

(21) Appl. No.: 10/717,605

(22) Filed: Nov. 21, 2003

(65) Prior Publication Data

US 2004/0141643 A1  Jul. 22, 2004

(30) Foreign Application Priority Data

Nov. 22, 2002  (EP) .................................. 02079935

(51) Int. Cl.
*G06K 9/34* (2006.01)
*G06K 9/18* (2006.01)
*G06K 9/00* (2006.01)
*G06K 9/46* (2006.01)
*G06K 9/66* (2006.01)

(52) U.S. Cl. ........................ 382/176; 382/185; 382/187; 382/190

(58) Field of Classification Search .......... 382/173–180
See application file for complete search history.

(56) References Cited

U.S. PATENT DOCUMENTS 6,175,844 B1 * 1/2001 Stolin .......................... 715/521
6,263,113 B1 * 7/2001 Abdel-Mottaleb et al. .. 382/237
6,470,095 B2   10/2002 Mahoney et al.
2001/0026633 A1  10/2001 Abdel-Mottaleb et al.

FOREIGN PATENT DOCUMENTS

EP        0 472 313 A2    2/1992

OTHER PUBLICATIONS

Belaid Y et al., "Item Searching in Forms: Application to French Text Form", Document analysis and recognition Proceedings of the third international conference on Montreal, Que., Canada, IEEE, pp. 744-747 (Aug. 14-16, 1995).
Antonacopoulos et al., "Flexible Page Segmentation Using the Background", IEEE, pp. 339-344 (1994).
Baird et al., "Image Segmentation by Shape-Directed Covers", IEEE, pp. 820-825 (1990).
Antonacopoulos et al., "Flexible Page Segmentation Using the Background", Pattern Recognition, IEEE, pp. 339-344 (Oct. 9-13, 1994).

* cited by examiner

*Primary Examiner*—Matthew C Bella
*Assistant Examiner*—Nathan Bloom
(74) *Attorney, Agent, or Firm*—Birch, Stewart, Kolasch & Birch, LLP (57) ABSTRACT

A method and device are provided for segmenting an image of pixels into a number of fields. First the method finds field separators using the background of the image, in particular white areas on a newspaper page. Based on the areas in the image, a graph is constructed that has edges corresponding to the white areas and vertices where vertical and horizontal white areas intersect. The segmenting starts with assigning weights to the edges, in particular a weight indicating the Euclidean distance between the vertices. Then a list of shortest cycles is constructed via the edges and vertices in the graph. The fields are defined by the vertices and edges of the shortest cycles of the list.

22 Claims, 7 Drawing Sheets

SEGMENTING AN IMAGE VIA SHORTEST CYCLES

The present application claims, under 35 U.S.C. § 119, the priority benefit of European Patent Application No. 02079935.9 filed Nov. 22, 2002, the entire contents of which are herein fully incorporated by reference.

BACKGROUND OF THE INVENTION

1. Field of the Invention

The invention relates to a method of segmenting a composite image of pixels into a number of fields corresponding to lay-out elements of the image, the pixels having a value representing the intensity and/or color of a picture element. The invention further relates to a device implementing the method, which device comprises an input unit for inputting an image, and a processing unit.

2. Discussion of the Related Art

Several methods for segmenting a composite image, such as a document including text and figures, to identify fields corresponding to layout elements, are known in the art, and a common approach is based on processing the background. The image is represented by pixels that have a value representing the intensity and/or color of a picture element. This value is classified as background (usually white) or foreground (usually black, being printed space). The white background space that surrounds the printed regions on a page is analyzed.

A method for page segmentation is known from the article "Image Segmentation by Shape-Directed Covers" by H. S. Baird et.al. in Proceedings 10th International Conference on Pattern Recognition, Atlantic City, N.Y., June 1990, pp. 820-825. According to this method, a set of maximal rectangles is constructed that are rectangles of background pixels that cannot be enlarged without including a foreground pixel. Fields are defined in the image based on the set by covering the total image with a reduced set of maximal rectangles. The remaining 'uncovered' area is considered foreground and fields are found by connected component analysis of the uncovered foreground areas. A problem of this method, however, is that the fields are defined as areas in the pixel domain, which does not allow computationally efficient further processing.

U.S. Pat. No. 6,470,095 discloses a method of page segmentation in which text areas are first preprocessed in a number of processing steps, to construct closed areas, called "enclosure blobs", of black pixels. In the remaining white spaces, bands of white space having a maximal length are constructed by suppressing bands of white space adjacent to a longer band. The final bands of white space, horizontal and vertical are then replaced by their midlines. Finally, the junctions between the horizontal and vertical midlines are detected, and loose ends are cut off. The remaining midline sections are used as delimiters of text fields. This known method involves a large number of processing steps and may in some instances give inaccurate results, when white spaces connect, but their midlines do not.

Further a method for page segmentation is known from the article "Flexible page segmentation using the background" by A. Antonacopoulos and R. T Ritchings in Proceedings 12th International Conference on Pattern Recognition, Jerusalem, Israel, October 9-12, IEEE-CS Press, 1994, vol2, pp. 339-344. According to this method, the background white space is covered with tiles, i.e. non-overlapping areas of background pixels.

The contour of a foreground field in the image is identified by tracing along the white tiles that encircle it, such that the inner borders of the tiles constitute the border of a field for further analysis. A problem of this method, however, is that the borders of the fields are represented by a complex description which frustrates an efficient further analysis.

SUMMARY OF THE INVENTION

It is an object of the invention to provide a method and device for segmenting an image which are more efficient, and in particular deliver a simple description of the segmented image that can easily be used in further processing steps.

According to a first aspect of the invention, the method includes: constructing a graph having vertices and edges connecting the vertices, on the basis of background areas in the image, the graph edges corresponding to field separators that together delineate the fields of the image; constructing a list of contiguous shortest cycles that together completely cover at least a part of the image, a shortest cycle being defined as a closed path from a vertex back to that same vertex via the edges of the graph, that has the lowest sum of weights of edges of all possible closed paths from that vertex back to that vertex; and defining the shortest cycles of the list as the fields of the image.

According to a second aspect of the invention, there is provided a device for segmenting an image of pixels into a number of fields corresponding to lay-out elements of the image, the pixels having a value representing the intensity and/or color of a picture element, which device includes: an input unit for inputting an image; a processing unit including a graph constructor for constructing a graph including vertices and edges connecting the vertices, on the basis of background areas in the image, the graph edges corresponding to field separators that together delineate the fields of the image, a path finding module for determining within a graph a closed path from a vertex back to that same vertex via the edges of the graph, that has the lowest sum of weights of edges of all possible closed paths from that vertex back to that vertex, further to be called a shortest cycle, a list module for constructing a list of contiguous shortest cycles that together completely cover at least a part of the image, and a field definer for defining the shortest cycles of the list as the fields of the image.

According to a third aspect of the invention, there is provided a computer program product embodied on a computer-readable medium for performing the method of the present invention.

Construction of a graph according to the present invention has the advantage that the edges provide a compact and efficient representation of the borders of the fields. Further analysis of the fields based on the graph is computationally efficient. However, the step from the graph representation of the image to the fields is not self-evident, because a graph does not have an inherent odering of edges and vertices that show the fields.

It is noted that a graph representation is used for representing the layout of a document by Y. Belaid et al., "Item searching in forms: application to french tax form", Document analysis and recognition, 1995, Proceedings of the third international conference on Montreal, Que., Canada, 14-16 Aug. 1995, Los Alamitos, Calif., USA, IEEE Comput. Soc., US, 14 Aug. 1995 (1995-08-14), pp. 744-747, XP010231002, ISBN: 0-8186-7128-9. However, according to this disclosure, a graph is constructed from existing black lines in the document, that frame fields that may or may not contain text. Thus, the use of text areas and white spaces in the document image is not made, and this known method would be useless in documents not having black frame lines.

The step of constructing a list of shortest cycles is a particularly advantageous way of determining the fields in the image, because the shortest cycles already have a shape substantially corresponding with the relevant polygon fields in the image. Such fields may have complex forms, although normally they are bordered by vertical and horizontal lines, at least in a Manhattan type layout, that is predominantly used in newspapers. Thus, the effect of constructing a list of shortest cycles is that the fields can be easily identified from the list.

In one embodiment of the invention, a weight is assigned to an edge, such as the Euclidean distance between the vertices of that edge. This weight is used in determining the shortest cycles. In this embodiment, the shortest cycles are indeed the "shortest" ones in Euclidean terms. Also other forms of weights may be contemplated, e.g. stepped functions of the distance.

In an embodiment of the present invention, the step of constructing the list of shortest cycles comprises selecting an edge that can be part of at most a single shortest cycle, determining the shortest path that connects the vertices of the edge alternative to the edge, and combining the edge and the shortest path. In this way, shortest cycles are efficiently found.

In a further embodiment, the step of constructing the list of shortest cycles is an iterative process, wherein, after finding a shortest cycle, the graph is reduced by removing any edge that is part of that shortest cycle and that cannot be part of a further shortest cycle, and then a next shortest cycle is determined. The advantage is that the graph is steadily reduced during the process of constructing the list of shortest cycles, which reduces the computational effort. Such an edge that can be part of at most a single shortest cycle is for instance an edge at the outer border of the graph.

In practice, a field of the image may be completely comprised in a larger field. As a consequence, also the shortest cycles corresponding to these fields have this property Yet, these fields need to be separately processed in the further interpretation steps following segmentation. Therefore, in a further embodiment, the step of defining the fields comprises checking if a first shortest cycle that encloses a first area completely includes a second shortest cycle that encloses a second area smaller than the first area, and, if so, subtracting the second enclosed area from the first enclosed area.

Alternatively, the list of shortest cycles is sorted based on the size of the enclosed areas of the shortest cycles and any further processing of the image is performed successively on fields corresponding to the shortest cycles in the order of the sorted list. Thus, if the smallest fields are processed first, they are automatically excluded from the processing of the larger field they are contained in. Such further processing is, e.g. determining the reading order.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other aspects of the invention will be apparent from and elucidated further with reference to the embodiments described by way of example in the following description and with reference to the accompanying drawings, in which.

These figures are diagrammatic and not drawn to scale. In these figures, elements which correspond to elements already described have the same reference numerals.

DETAILED DESCRIPTION OF THE PREFERRED EMBODIMENTS

Figure 1:
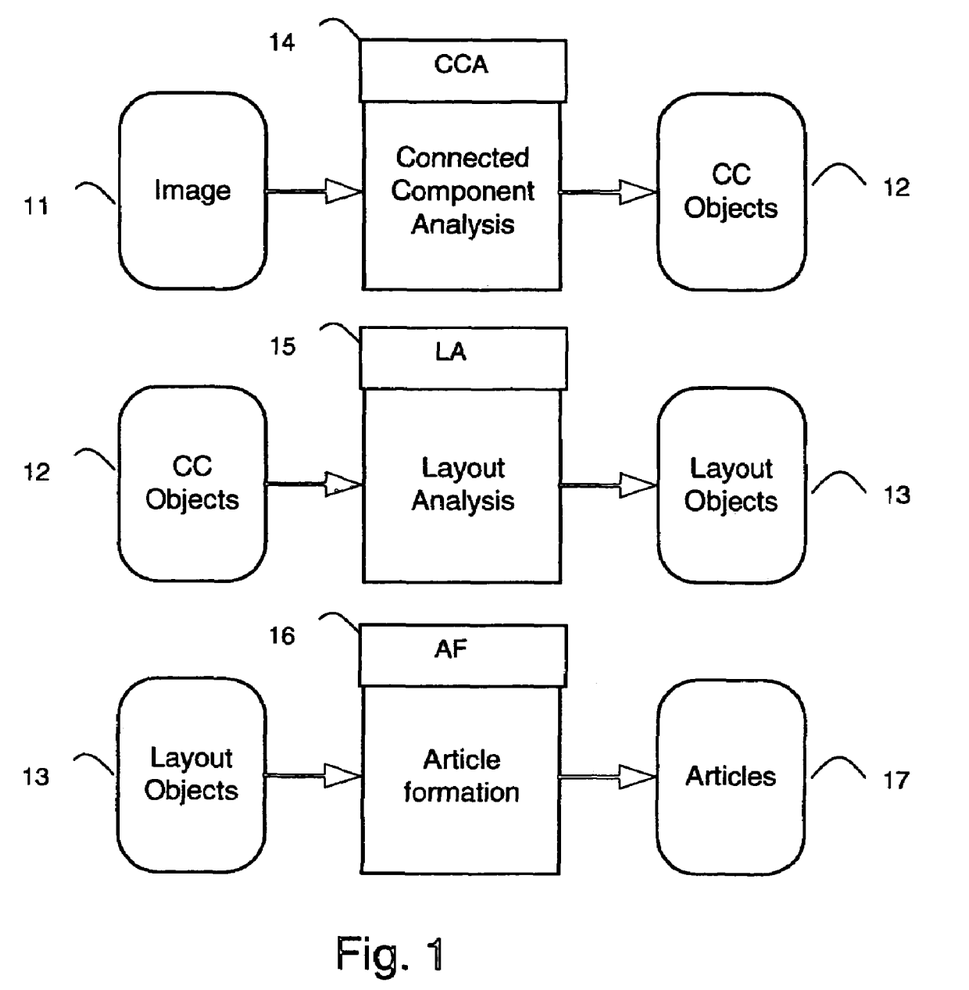
FIG. 1 shows an overview of an exemplary segmentation method according to an embodiment of the present invention.

FIG. 1 shows an overview of an exemplary segmentation method, showing three basic steps from known segmentation systems. As shown in FIG. 1, the input image 11 is processed in a CCA (Connected Component Analysis) module 14 that analyses the pixels of the image using Connected Component Analysis. First an original picture that may be a black-and-white, grayscale or colored document, e.g. a newspaper page, is scanned, preferably in gray scale. Grayscale scanned pictures are halftoned for assigning a foreground value (e.g. black) or a background value (e.g. white) to each pixel. The CCA module 14 finds foreground elements in the image by detecting connected components (CC) of adjacent pixels having similar properties. An example of such first steps in the segmentation process are for instance described in U.S. Pat. No. 5,856,877. The CCA 14 module produces as output CC Objects 12 that are connected components of connected foreground pixels.

An LA (Layout Analysis) module 15 receives the CC Objects 12 as input and produces Layout Objects 13 by merging and grouping the CC Objects to form larger layout objects such as text lines and text blocks. During this phase, heuristics are used to group layout elements to form larger layout elements. This is a logical step in a regular bottom-up procedure. Then an AF (Article Formation) module 16 receives the Layout Objects 13 as input and produces Articles 17 as output by article formation. In this module 16, several layout objects that constitute a larger entity are grouped together. The larger entity is assembled using layout rules that apply to the original picture. For example, in a newspaper page the AF module 16 groups the text blocks and graphical elements like pictures to form the separate articles, according to the layout rules of that specific newspaper style. Knowledge of the layout type of the image, e.g. Western type magazine, Scientific text or Japanese article layouts, can be used for a rule-based approach of article formation resulting in an improved grouping of text blocks.

Figure 2:
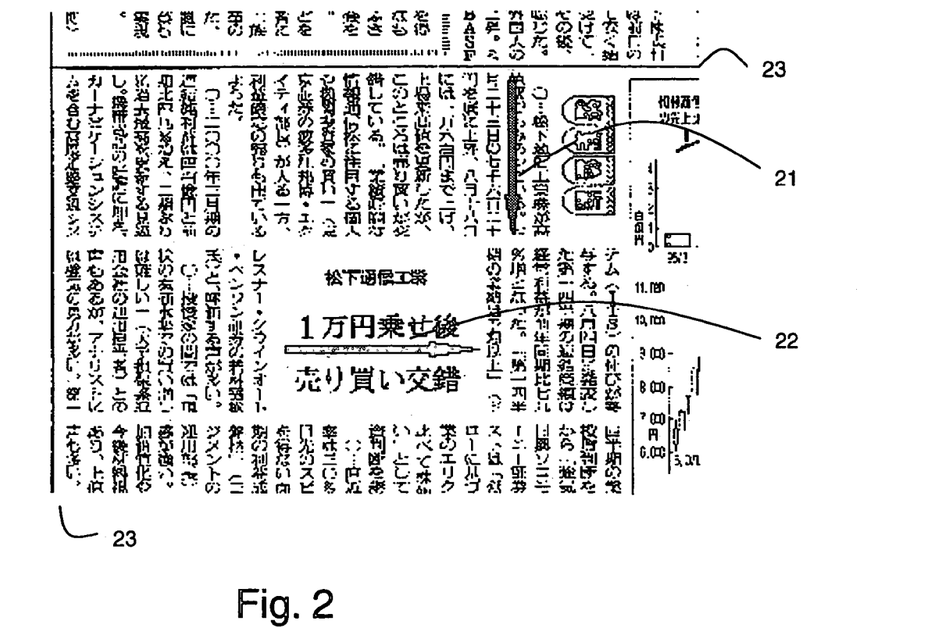
FIG. 2 shows a part of a sample Japanese newspaper.

According to the present invention, additional steps are added to the segmentation as described below. The steps relate to segmentation of the image into fields before detecting elements within a field, i.e. before forming layout objects that are constituted by smaller, separated but interrelated items. FIG. 2 shows a sample Japanese newspaper. Such newspapers have a specific layout that includes text lines in both the horizontal reading direction 22 and the vertical reading direction 21. The problem for a traditional bottom-up grouping process of detected connected components is that it is not known in which direction the grouping should proceed. Hence the segmentation is augmented by an additional step of processing the background for detecting the fields in the page. Subsequently the reading direction for each field of the Japanese paper is detected before the grouping of characters is performed.

In an embodiment of the present method, separator elements, e.g. black lines 23 for separating columns are detected and converted into background elements. With this option, it is possible to separate large elements of black lines 23 containing vertical and horizontal lines that are actually connected into different separator elements. In Japanese newspapers, lines are very important objects for separating fields in the layout. It is required that these objects are recognized as lines along separation directions. Without this option, these objects would be classified as graphics. Using the option, the lines can be treated as separator elements in the different orientations separately for each separation direction.

Figure 3:
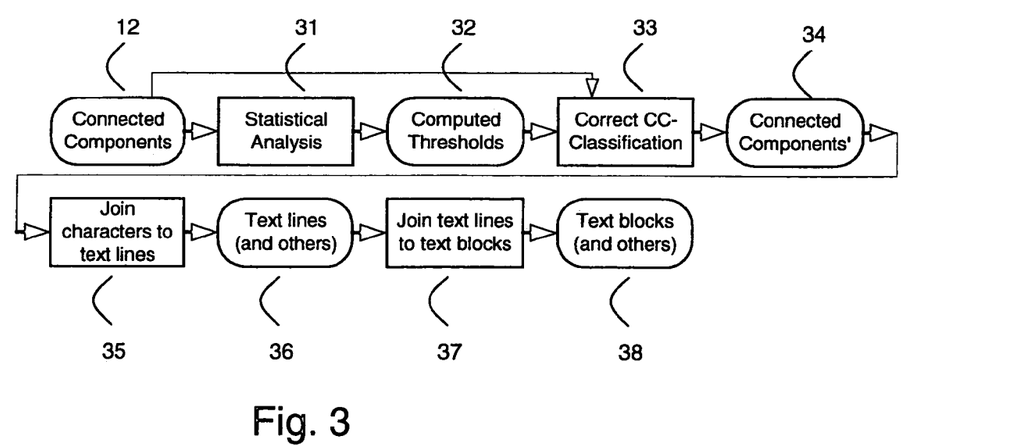
FIG. 3 shows the merging of objects along a single direction according to an embodiment of the present invention.

FIG. 3 shows a basic method of merging objects in a single direction. FIG. 3 depicts the basic function of the LA module 15 for finding the layout objects oriented in a known direction, such as text blocks for the situation that the reading order is known. Connected components 12 (CC objects) are processed in a first, analysis step 31 by statistical analysis resulting in computed thresholds 32. In a second, classification step 33, the CC-classification is corrected resulting in the corrected connected components 34, which are processed in a third, merging step 35 to join characters to text lines, resulting in text lines and other objects 36. In a fourth, text merging step 37, the text lines are joined to text blocks 38 (and possibly other graphical objects). According to the requirements for Japanese news papers, the traditional joining of objects must be along at least two reading directions, and the basic method described above must be improved therefor.

Figures 4, 5:
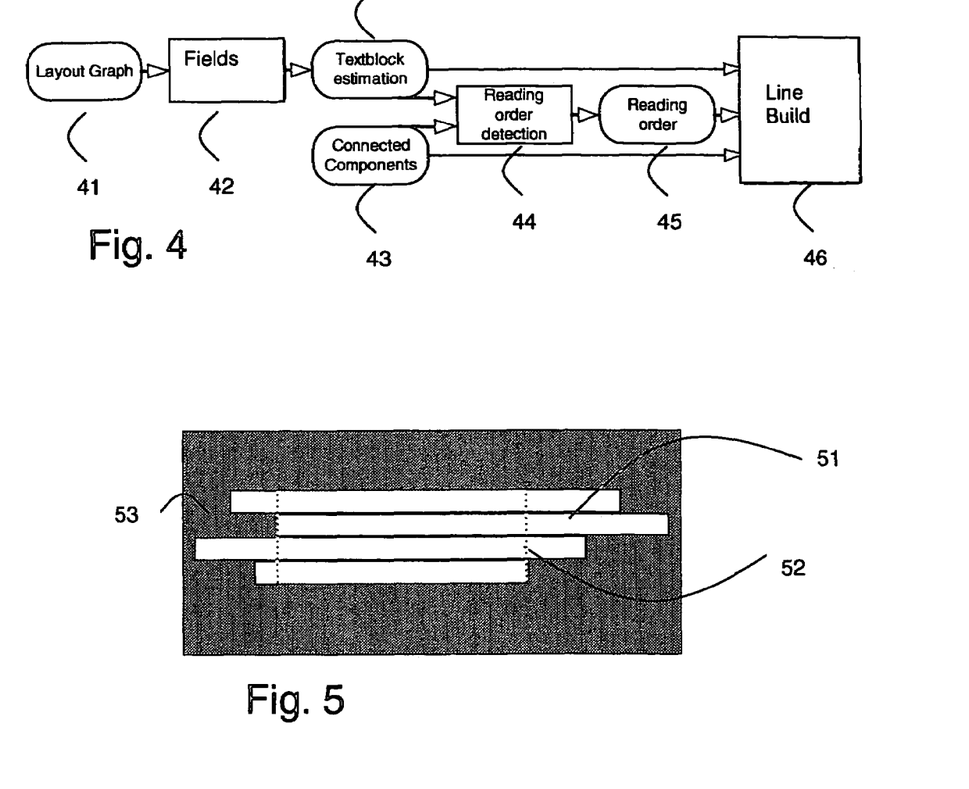
FIG. 4 shows segmentation and two directional merging of objects.
FIG. 5 shows construction of a maximal rectangle from white runs.

FIG. 4 shows segmentation and two directional joining of objects. Here, new additional steps have been added compared to the single directional processing in FIG. 3. As shown in FIG. 4, in a first (pre-) processing step, a graph 41 of the image is constructed. The construction of the graph 41 by finding field separators is described below. In the graph, fields are detected in a field detection step 42 by finding areas that are enclosed by edges of the graph. The relevant areas are classified as fields containing text blocks 47 in the text block 47 (using the connected components 43 or corrected connected components 34 that are in the text block area), the reading order 45 is determined in a step 44. The reading direction detection is based upon the document spectrum. Using the fields of the text blocks 47, the contained connected components 43 and the reading order 45 as input, a line build step 46 joins the characters to lines as required along the direction found.

Now the constructing of the graph 41 is described. A graph-representation of a document is created using the background of a scan. Pixels in the scan are classified as background (usually white) or foreground (usually black). Because only large areas of white provide information on fields, small noise objects are removed, e.g. by down-sampling the image. The down-sampled image may further be de-speckled to remove single foreground (black) pixels.

The next task is to extract the important white areas. In this task, the first step is to detect so-called white runs, one pixel high areas of adjacent background pixels. White runs that are shorter than a predetermined minimal length are excluded from the processing.

Figure 6:
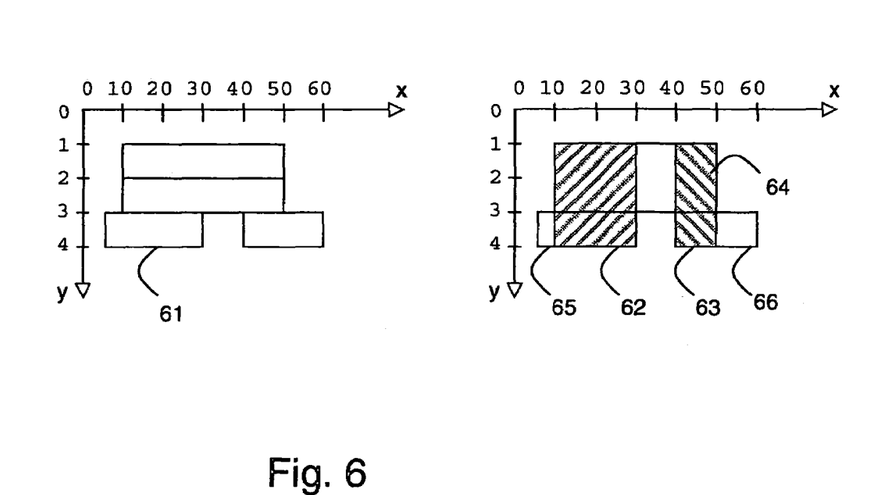
FIG. 6 shows construction of maximal white rectangles.

FIG. 5 shows, as an example, four horizontal runs 51 of white pixels, that are adjacent in the vertical direction. As shown in FIG. 5, a foreground area 53 is assumed to have foreground pixels directly surrounding the white runs 51. A "maximal white rectangle" is defined as the largest rectangular area that can be constructed from the adjacent white runs 51, hence a rectangular white area that can not be extended without including black (foreground) pixels. A maximal white rectangle 52 is shown based on the four white runs 51 having a length as indicated by the vertical dotted lines and a width of 4 pixels. When a white rectangle can not be extended, it has a so-called maximal separating power. Such a rectangle is not a smaller part of a more significant white area. Hence the rectangle 52 is the only possible maximal rectangle of width 4. Further rectangles can be constructed of width 3 or 2. A further example is shown in FIG. 6.

The construction of white rectangles is done separately in different separation directions, e.g. horizontal and vertical white rectangles. Vertical white rectangles are detected by rotating the image, and detecting horizontal white runs for the rotated image. It is noted that depending on the type of image or application also, other separation directions may be selected such as diagonal.

An algorithm for constructing maximal white rectangles is as follows. The input of the algorithm includes all horizontal one pixel high white runs (WR) detected from a given image. Each white run is represented as a rectangle characterized by a set of coordinates $((x_1,y_1),(x_2,y_2))$, where $x_1$ and $y_1$ are coordinates of its top left corner and $x_2$ and $Y_2$ are the coordinates of its bottom right corner. Each white run present in the active ordered object INPUT LIST is tested on an extension possibility. The extension possibility is formulated in the condition whether a given WR, labeled by p, can produce a maximal white rectangle (MWR) or not. If the extension possibility is FALSE, p is already a maximal one, and p is deleted from the active INPUT LIST and written to the active RESULT LIST. If the extension possibility is TRUE, the test for extension is repeated until all MWRs initiated by p have been constructed. Then p is deleted from the INPUT LIST and all MWRs obtained from p are written to the active RESULT LIST. When all white rectangles from the INPUT LIST have been processed, the RESULT LIST will contain all MWRs. To increase the efficiency of the algorithm, a sort on the y value is applied to the INPUT LIST. First, the algorithm is applied for horizontal WRs, i.e. for white runs with width larger than height. And after a 90° turn of the image, it can be applied to vertical WRs.

In an embodiment, the algorithm for constructing the maximal rectangles is as follows. The rectangle data are stored as a linked list, with at least the coordinates of the rectangle vertices contained in it. The INPUT LIST and RESULT LIST are stored as a linked list too, with at least three elements, such as the number of white rectangles, and pointers on the first and the last element in the linked list. The following steps are executed: Activate INPUT LIST; Initiate RESULT LIST; and Initiate BUFFER for temporary coordinates of the selected rectangle. Start from the first white rectangle labeled by $p_1$ out of the active ordered INPUT LIST. The next white rectangle on the list is labeled by $p_2$. For each white rectangle on the INPUT LIST, examine if $p_1$ has extension possibility. For the active white rectangle $p_1$, find the first one labeled by $p_{nj}$, with j=1, . . . , l where "l" is a positive integer, on the active ordered INPUT LIST, which satisfies:

$$y_2(p_1) = y_1(p_{nj}),$$

$$x_1(p_{nj}) \leq x_2(p_1), \text{ and}$$

$$x_2(p_{nj}) \geq x_1(p_1).$$

This search results in the set $\{p_{n1}, p_{n2}, \ldots, p_{nl}\}$. Only if the set $\{p_{n1}, p_{n2}, \ldots, p_{nl}\}$ is not empty, $p_1$ is said to have extension possibility.

If $p_1$ does not have an extension possibility, then $p_1$ is a maximal white rectangle. As such, write $p_1$ to the RESULT LIST, and remove p1 from the INPUT LIST, and proceed with $p_2$. If $p_1$ is extendible, i.e., has an extension possibility, then apply the Extension Procedure to $p_1$. Then proceed with $p_2$. We note here that $p_1$ can have an extension possibility while being maximal itself.

The Extension Procedure is as follows. Suppose $p_1$ has an extension possibility, then there is the set $\{p_{n1}, p_{n2}, \ldots, p_{nl}\}$. The Extension Procedure is applied to each element of $\{p_{n1}, p_{n2}, \ldots, p_{nl}\}$ consistently. For the white rectangle $p_1$ which is extendible with rectangle $p_{nj}$ with j=1. . . , l, construct a new rectangle $p_{1,nj}$ with coordinates:

$$x_1(p_{1,nj}) = \max\{x_1(p_1), x_1(p_{nj})\},$$

$$x_2(p_{1,nj}) = \min\{x_2(p_1), x_2(p_{nj})\},$$

$$y_1(p_{1,nj}) = y_1(p_1), \text{ and}$$

$$y_2(p_{1,nj}) = y_2(p_{nj}).$$

Write the coordinates of $p_{1,nj}$ with j=1, . . . , l to the "coordinates" buffer. Repeat the test on extension possibility now for $p_{1,nj}$. If the test is TRUE, $p_{1,nj}$ is maximal. Then write $p_{1,nj}$ to the RESULT LIST, otherwise, extend $p_{1,nj}$.

Before applying the extension procedure to $p_{1,nj}$, we check $p_1$ and $p_{nj}$ for absorption effect. The test of $p_1$ and $p_{nj}$ for absorption effect with $p_{1,nj}$ is as follows. By absorption effect we mean the situation in which $p_1$ ($p_{nj}$) or both is (are) completely contained in $p_{1,nj}$. In coordinates this means:

$$x_1(p_{1,nj}) \leq x_1(p_k),$$

$$x_2(p_{1,nj}) \geq x_2(p_k), \text{ where } k=1, n_j \text{ and } j=1, \ldots, l.$$

If the condition is TRUE for $p_1$, then $p_1$ is absorbed by $p_{1,nj}$. Then remove $p_1$ from the INPUT LIST. If the condition is TRUE for $p_{nj}$, then $p_{nj}$ is absorbed by $p_{1,nj}$. Then remove $p_{nj}$ from the INPUT LIST.

The above algorithm assumes that the rectangle is wider than it is high, and thus the rectangles are primarily horizontal. To construct MWRs in the vertical direction, the original binary image is rotated by 90° clockwise. The algorithm mentioned above is repeated for the rotated image. As a result, all vertical MWRs for the original image are constructed.

FIG. 6 shows a construction of maximal white rectangles. The pixel coordinates are displayed along a horizontal x axis and a vertical y axis. Four white runs 61 are shown left in FIG. 6. The white runs (WR) are described as rectangles with the coordinates of their upper and bottom corners correspondingly:

$$WR_1: ((10,1),(50,2)),$$

$$WR_2: ((10,2),(50,3)),$$

$$WR_3: ((5,3),(30,4)), \text{ and}$$

$$WR_4: ((40,3),(60,4)).$$

All maximal white rectangles from these white runs are constructed. The resulting five maximal white rectangles (MWR) are shown on the right part of FIG. 6 as indicated by 62, 63, 64, 65 and 66. The five MWR shown are the complete set of MWR for the WR given on the left part of FIG. 6. A construction algorithm is as follows.

Let the INPUT LIST contain the four white runs 61. The first element from the INPUT LIST is $WR_1((10,1),(50,2))$. Label $WR_1$ as $p_1$. Examine $p_1$ on the extension possibility as described above. The first candidate for extension is $WR_2$ ((10,2),(50,3)). Label $WR_2$ as $p_{n1}$. Extend $p_1$ with $p_{n1}$ according to the formula for extension above, which gives a new rectangle $p_{1,n1}$ with the coordinates ((10,1),(50,3)). Test $p_1$ and $p_{n1}$ on the absorption effect with $p_{1,n1}$. As follows from absorption test, both $p_1$ and $p_{n1}$ are absorbed by $p_{1,n1}$. Therefore, delete $p_1$ and $p_{n1}$ from the INPUT LIST. Proceed with $p_{1,n1}$. Test $p_{1,n1}$ on the extension possibility, which gives the first candidate $WR_3$ ((5,3),(30,4)). Label $WR_3$ as $p_{t1}$. Extend $p_{1,n1}$ with $p_{t1}$ according to the extension formula. As a result, we obtain a new rectangle $p_{(1,n1),t1}$ with the coordinates ((10,1),(30,4)). Test $p_{1,n1}$ with $p_{t1}$ on the absorption effect with $p_{(1,n1),t1}$. The test fails.

Repeat the test on extension possibility for $p_{(1,n1),t1}$ The test fails, i.e. $p_{(1,n1),t1}$ has no extension possibility. It means that $p_{(1,n1),t1}$ is maximal. Then, write $p_{(1,n1),t1}$ with the coordinates ((10,1),(30,4)) to the RESULT LIST.

Proceed again with $p_{1,n1}$ and test it on extension possibility. The second candidate $WR_4$ ((40,3),(60,4)) is found. Label $WR_4$ as $p_{t2}$. Extend $p_{1,n1}$ with $p_{t2}$ according to the extension formula. As a result, we obtain a new rectangle $p_{(1,n1),t2}$ with the coordinates ((40,1),(50,4)).

Test $p_{1,n1}$ with $p_{t2}$ on the absorption effect with $p_{(1,n1),t2}$. The test fails, i.e. no absorption. Repeat the test on extension possibility for $p_{(1,n1),t2}$ and the test fails, i.e. $p_{(1,n1),t2}$ has no extension possibility. It means that $p_{(1,n1),t2}$ is maximal. Then write $p_{(1,n1),t2}$ with the coordinates ((40,1),(50,4)) to the RESULT LIST.

Test $p_{1,n1}$ again on extension possibility. The test fails and $p_{1,n1}$ is maximal. Then write $p_{1,n1}$ with the coordinates ((10,1),(50,3)) to the RESULT LIST.

Return to the INPUT LIST. The INPUT LIST on this stage contains two write runs, i.e. $WR_3$: ((5,3),(30,4)), $WR_4$: ((40,3),(60,4)). Start from $WR_3$, and label it as $p_2$. Repeat test on extension possibility for $p_2$. The test fails, so $p_2$ is maximal. Then write $p_2$ with the coordinates ((5,3),(30,4)) to the RESULT LIST. Remove $p_2$ from the INPUT LIST.

Proceed with $WR_4$ and label it as $p_3$. Test on extension possibility for $p_3$, which gives us that $p_3$ is maximal. Write $p_3$ with the coordinates ((40,3),(60,4)) to the RESULT LIST. Remove $p_3$ from the INPUT LIST. Finally, the RESULT LIST contains five maximal white rectangles, I.E. $MWR_1$: ((10,1),(50,3) indicated in FIG. 6 as 64, $MWR_2$: ((10,1),(30,4)) indicated as 62, $MWR_3$:((40,1),(50,4)) indicated as 63, and $MWR_4$: ((5,3),(30,4)) as 65, $MWR_5$: ((40,3),(60,4)) as 66.

Figure 7:
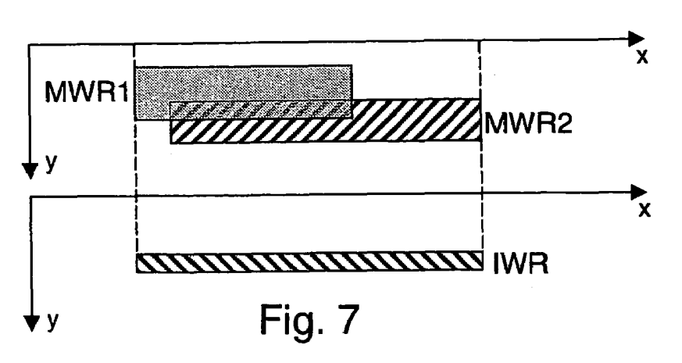
FIG. 7 shows cleaning of overlapping maximal white rectangles.

FIG. 7 shows a next step in the method according to the invention, namely a cleaning step for overlapping maximal white rectangles. In the cleaning step, plural overlapping maximal white rectangles are consolidated into a single so-called "Informative Maximal Rectangle" (IWR) that combines the most relevant properties of the original maximal white rectangles, as discussed below in detail.

The cleaning step may further include steps like checking on size and spatial relation of the maximal white rectangles.

The upper part of FIG. 7 shows, as an example, two maximal white rectangles MWR1 and MWR2. The pair is consolidated into a single Informative White Rectangle IWR in the cleaning step as shown on the lower part of FIG. 7. The process of detecting the overlap and consolidating is repeated until no relevant MWR pairs can be formed anymore. A criterion for forming pairs may be the size of the overlap area.

Further, the cleaning step may include removing thin or short rectangles or rectangles that have an aspect ratio below a certain predefined value. The criteria for removing the rectangles are based on the type of image, e.g. a width below a predefined number of pixels indicates a separator of text lines and is not relevant for separating fields, and a length below a certain value is not relevant in view of the expected sizes of the fields.

An algorithm for the cleaning step is as follows. The start of the cleaning procedure is the whole set of MWRs constructed as described above with reference to FIGS. 5 and 6. The cleaning procedure is applied to discard non-informative MWRs. For this reason a measure of non-informativeness is defined. For example, a long MWR is more informative than a short one. A low aspect ratio indicates a more or less square rectangle that is less informative. Further, extremely thin rectangles, which for instance separate two text lines, must be excluded. First, all MWRs are classified as being horizontal, vertical or square by computing the ratio between their heights and widths. Square MWRs are deleted because of their non-informativeness. For the remaining horizontal and vertical MWRs, the cleaning technique is applied which includes the following three steps:

Each MWR with a length or width below a given value is deleted.

Each MWR with an aspect ratio (AR) below a given value is deleted where the AR is defined as the ratio of the longer side length divided by the shorter side length.

For each pair of overlapping horizontal (or vertical) $MWR_1$ $((x_1,y_1),(x_2,y_2))$ and horizontal (or vertical) $MWR_2$ $((a_1,b_1),(a_2,b_2))$, an informative white rectangle IWR is constructed with the following coordinates:

(a) Horizontal overlap:

$x_1 = \min\{x_1, a_1\}$, $y_1 = \max\{y_1, b_1\}$, $x_2 = \max\{x_2, a_2\}$, $y_2 = \min\{y_2, b_2\}$.

(b) Vertical overlap:

$x'_1 = \max\{x_1, a_1\}$, $y'_1 = \min\{y_1, b_1\}$, $x'_2 = \min\{x_2, a_2\}$, $y'_2 = \max\{y_2, b_2\}$.

This process is repeated for all pairs of overlapping MWRs. The set of MWRs now comprises Informative White Rectangles IWRs. These IWRs form the starting point for an algorithm for segmentation of the image into fields corresponding to the lay-out elements. The IWRs are potential field separators and are therefore called "separating elements". Using the IWRs, the algorithm constructs a graph for further processing into a geographical description of the image.

Figure 8:
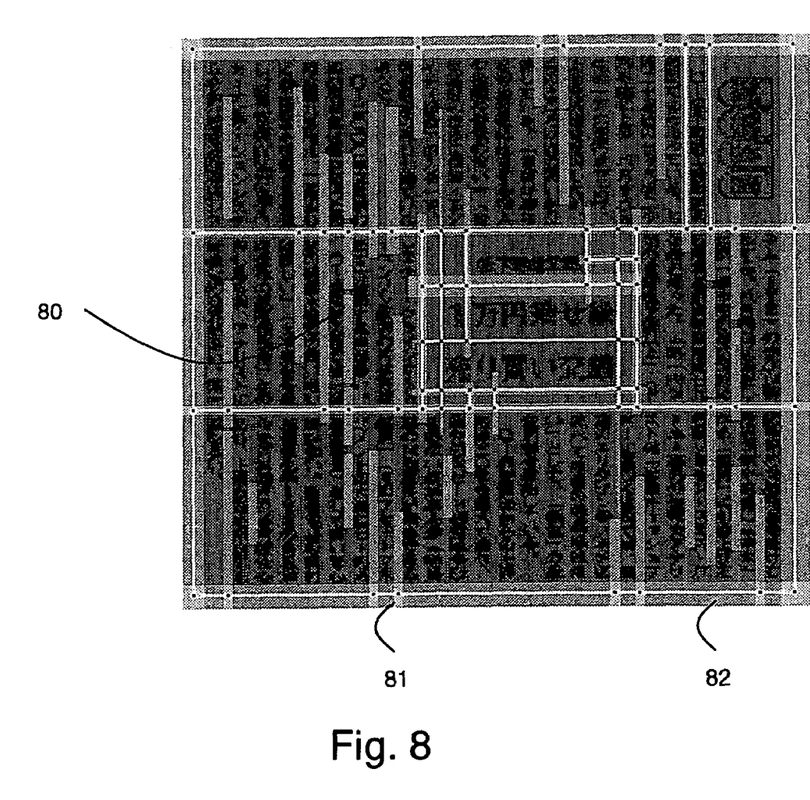
FIG. 8 shows a graph on a newspaper page.

FIG. 8 shows such a graph on a newspaper page. The picture in FIG. 8 shows a down-sampled digital image 80 of a newspaper page. The original text is visible in black in a down-sampled version corresponding to FIG. 2. The informative rectangles IWR constituting separating elements are shown in gray. For the construction of the graph, intersections of separating elements constituted by horizontal and vertical white IWRs are determined. The intersection point of two IWRs is indicated by a small black square representing a vertex or vertices 81 in the graph. Edges 82 that represent lines that separate the fields in the page are constructed by connecting pairs of vertices 81 via "field separators". The edges 82 of the graph are shown in white. The distance between the two vertices of an edge, i.e. the length, is assigned as weight to the edge for further processing. In an alternative embodiment, a different parameter is used for assigning the weight, e.g. the color of the pixels. An algorithm for constructing the graph is as follows.

At the beginning, the following notation and definitions for IWRs is given. Let $R = \{r_1, \ldots, r_m\}$ be the non-empty and finite set of all IWRs obtained from a given image l, where each IWR is specified by its x- and y- coordinates of top left corner and bottom right corner $((x_1^{(\tau)}, y_1^{(\tau)}), (x_2^{(\tau)}, y_2^{(\tau)}))$, $\tau = 1, 2, \ldots, m$ respectively. Each rectangle $r_\tau$ is classified as horizontal, vertical or square based on the ratio of its height and width. $H = \{h_1, \ldots, h_l\}$, $V = \{v_1, \ldots, v_k\}$, and $S = \{s_1, \ldots, s_d\}$ denote the subsets of horizontal, vertical and square IWRs, respectively, such that $H \cup V \cup S = R$ and $m = l + k + d$, and $H \cap V = \emptyset$, $V \cap S = \emptyset$, $H \cap S = \emptyset$, where it is assumed that $H \neq \emptyset, V \neq \emptyset$.

Further the contents of S are ignored and only the subsets H and V are used. This is based on the consideration that in most cases white spaces that form the border of text or non-text blocks are oblong vertical or horizontal areas. Let h be part of H with coordinates $((x_1,y_1),(x_2,y_2))$ and v in V with coordinates $((a_1,b_1),(a_2,b_2))$. Then h and v have an overlap if:

$$\begin{cases} x_1 \leq a_2 \\ y_1 \leq b_2 \\ x_2 \geq a_1 \\ y_2 \geq b_1. \end{cases}$$

By the intersection point of h and v in case of overlap, we take the unique point P defined by the coordinates:

$$\begin{cases} x_P = \frac{1}{2}(\max\{x_1, a_1\} + \min\{x_2, a_2\}), \\ y_P = \frac{1}{2}(\max\{y_1, b_1\} + \min\{y_2, b_2\}). \end{cases}$$

For IWRs, only two from all possible types of overlap occur, namely, an overlap resulting in a rectangle and an overlap resulting in a point. Line overlap cannot occur, because this would be in contradiction with the concept of the MWRs.

Figure 9:
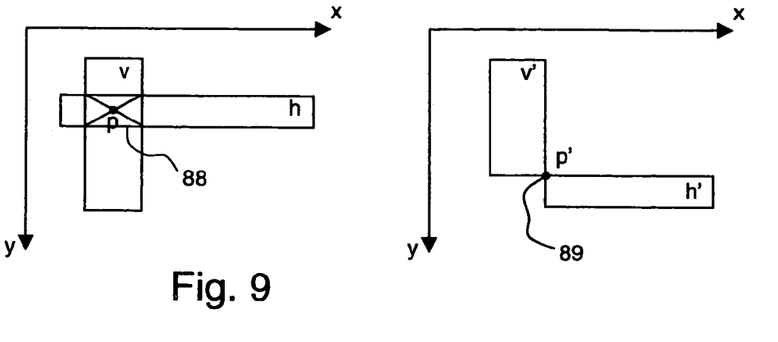
FIG. 9 shows two types of intersection of maximal rectangles.

FIG. 9 shows two types of intersection of maximal rectangles. For constructing the graph, the intersection points of vertical and horizontal informative maximal rectangles are determined to find the position of vertices of the graph, i.e. to determine the exact coordinates of the vertices. The left graph of FIG. 9 shows a first type of intersection of vertical IWR v and a horizontal IWR h, which results in a rectangular area 88 with a center of intersection point P. The right graph of FIG. 9 shows a second type of intersection of a vertical IWR v' and a horizontal IWR h', that results in a single intersection point 89 with a center of intersection at P'.

An algorithm for constructing the graph based on the intersection points is as follows.

$P=\{p_1, \ldots, p_N\}$ denotes the set of all intersection points of vertical IWRs and horizontal IWRs where each p in P is specified by its x- and y- coordinates $(x_p, y_p)$, where $p=1, \ldots, N$. Let the set P be found, and $G=(X,A)$ an undirected graph having correspondence to P. The graph $G=(X,A)$ includes a finite number of vertices X which are directly related to the intersection points and a finite number of edges A which describe the relation between intersection points. Mathematically this is expressed as:

$$G(P)=(X(P), A\ (P\times P)),$$

$$P: H\times V \rightarrow \{x_p, y_p\},$$

where $$X \equiv \{1, \ldots, N\} \text{ and}$$

$$A = (\{1, \ldots N\} \times \{1, \ldots, N\}) \text{ with}$$

$$A(i,j) = \begin{cases} \infty, & \text{if } i \text{ and } j \text{ are not 4-chain connected,} \\ d_{ij}, & \text{if } i \text{ and } j \text{ are 4-chain connected} \end{cases}$$

where $d_{ij}$ indicates the Euclidean distance between points i and j, and where 4-chain connected means that the vertices of a rectangular block are connected in four possible directions of movement. In the above, two points i and j are 4-chain connected if they can be reached by walking around with the aid of 4-connected chain codes with min $d_{ij}$ in one direction.

The graph as constructed may now be further processed for classifying the areas within the graph as text blocks or a similar classification depending on the type of picture. In an embodiment, the graph is augmented by including foreground separators, e.g. black lines or patterned lines such as dashed/dotted lines, in the analysis. Also, edges of photos or graphic objects which are detected can be included in the analysis.

The present segmenting method may also include a step of removing foreground separators. In this step, first, foreground separators are recognized and reconstructed as single objects. The components that constitute a patterned line are connected by analyzing element heuristics, spatial relation heuristics and line heuristics, i.e. building a combined element in a direction and detecting if it classifies as a line. A further method for reconstructing a solid line from a patterned line is down-sampling and/or using the Run Length Smoothing Algorithm (RLSA) as described by K. Y. Wong, R. G. Casey, F. M. Wahl in "Document analysis system", IBM J. Res. Dev 26 (1982), pp. 647-656. After detecting the foreground separators, they are replaced by background pixels. The effect is that larger maximal white rectangles can be constructed, or supporting any other suitable method using the background pixel property for finding background separators.

Figure 11:
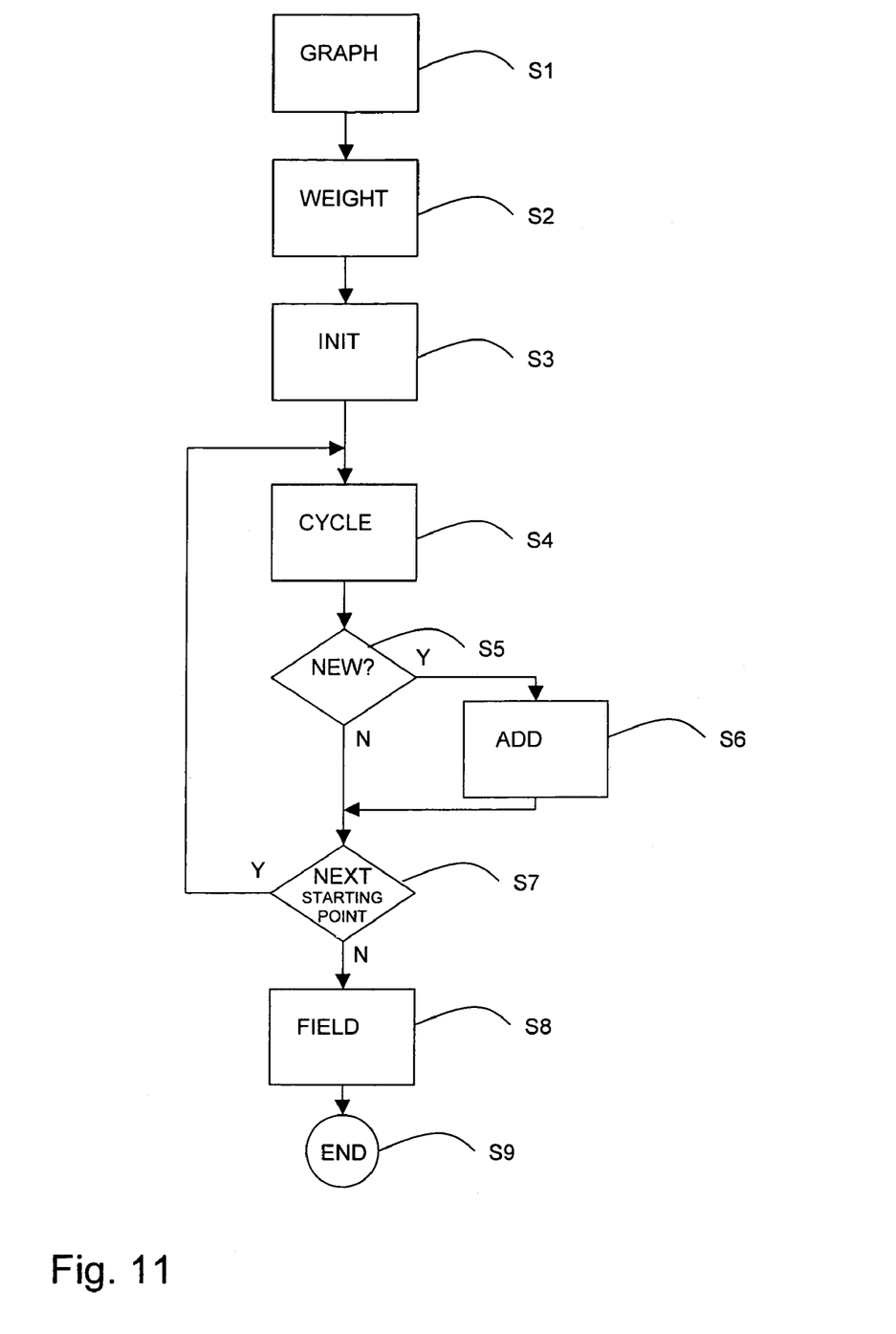
FIG. 11 shows a flow diagram for defining fields based on a list of shortest cycles according to an embodiment of the present invention.

FIG. 11 shows a flow diagram of a method, according to the invention, for defining fields in an image of pixels, based on generating a list of shortest cycles in a graph representation of the image. Basically, this method first constructs a mathematical description of the image of pixels in the form of a graph having vertices and edges connecting the vertices. Then, the graph is broken up into contiguous areas having a smallest possible perimeter, i.e. areas that are delineated by smallest possible cycles formed by edges of the graph. Finally, fields are defined in the pixel domain of the original image, in correspondence with the (mathematically defined) smallest cycles. This approach of searching for the smallest possible cycles in the graph has the advantage that the corresponding calculations are simple and fast. Yet, the results are not always entirely correct, when a first shortest cycle completely contains a second, smaller shortest cycle. See, for example, FIG. 12b, where a shortest cycle 104a completely contains two smaller shortest cycles (around the rectangles 103a and 103b). Below we will show that this effect does not lead to problems.

Referring to FIG. 11, in a GRAPH step S1, a graph is constructed having edges that correspond to background areas separating the fields in the image. The vertices in the graph correspond to angular points of the fields in the image. The fields in the image are for example text blocks in a newspaper page. Basically, the fields are polygon areas having mainly vertical and horizontal borders, but they are not necessarily rectangular. For instance, L-shaped text blocks appear frequently in practical situations.

An example of constructing a graph has been described above with reference to FIGS. 8 and 9. Any other way of constituting a graph for representing an image that has fields is suitable, provided that the graph has edges corresponding to the actual borders of the fields in the original image. It is noted that the task of finding a field in the graph includes identifying the edges and/or vertices that are bordering that field. This is not evident from the graph as such, because the graph does not have an inherent ordering of edges and vertices that show the fields. Thereto the following steps are performed.

In a WEIGHT step S2, a weight is assigned to each edge. The weight of an edge in a graph of a layout type image to be segmented may be the Euclidian distance between the vertices, i.e. its length in the original image. In an embodiment, for a different type of application where the image represents a different structure, e.g. a map, a suitable measure for weight may be traveling time, or a different parameter like cost. In the weight assigning step, the weight for each edge is calculated and added to the graph data-structure.

In the following steps, shortest cycles are determined. A shortest cycle is defined as a closed path in the graph via edges that are connected by vertices, which path has the lowest sum of weights accumulated by adding the weights of the edges involved. In an INIT step S3, a list of shortest cycles is created having an initially empty content, and a first starting point, a vertex or edge, within the graph is determined. For example for this purpose the graph is sorted and the first starting point is set to be the upper left corner vertex of the graph. The process now enters a loop of steps S4, S5, S6 and S7, in which a shortest cycle is constructed starting from the preselected starting point. At the end of the loop, the NEXT step S7 selects a new starting point for finding a next shortest cycle. The status of the vertices or edges in the graph for still being available as candidate starting point is maintained. If no candidate starting points are remaining, step S7 terminates the loop and proceeds to the next step S8.

Within the loop, the CYCLE step S4 determines a shortest cycle for the selected starting point. The shortest cycle algorithm may construct every possible cycle and select the shortest cycle from the set. The shortest cycle found is judged in the NEW step S5 for being new with respect to the list of shortest cycles already found. If the shortest cycle is new, the ADD step S6 is performed for adding the latest shortest cycle to the list of shortest cycles. Suitable algorithms for constructing the shortest cycle, selecting and maintaining starting points and constructing the list of new shortest cycles are described below.

At the time that the NEXT step S7 detects that no further candidate starting points are available, the list contains the shortest cycles that can be formed in the graph. The NEXT step S7 may also be arranged for detecting if a required specific part of the graph has been fully processed. Such a required part can be defined if it is known from the application that only fields contained in a specific part of the graph need to be constructed. The list of shortest cycles will then contain the shortest cycles in that part of the graph only.

In the FIELD step S8, the fields are defined on the basis of the list of shortest cycles. A field is a polygon represented by the vertices and edges in the shortest cycle that encloses the field. The step S8 may also include additional steps for detecting shortest cycles that contain other, smaller shortest cycles, and for correcting the initial results for that case.

The process is completed at the END step S9.

In an embodiment, the FIELD step S8 includes an additional step for defining the fields. First it is determined if a shortest cycle that encloses a larger area further contains a smaller area that itself is enclosed by a second shortest cycle. The corresponding larger field is corrected by subtracting the smaller enclosed area from the larger enclosed area. Alternatively the field corresponding to the second shortest cycle is processed before processing the field corresponding to the first shortest cycle. When processing the latter the first area is skipped. The additional step is further explained below with reference to FIG. 12b.

Figure 12A:
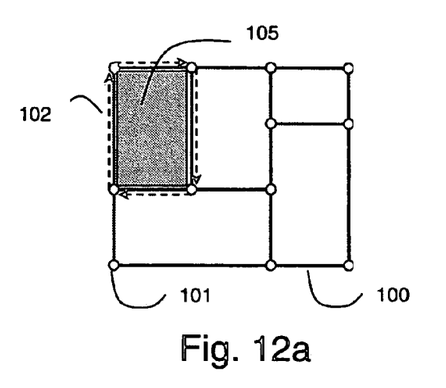
FIGS. 12a and 12b show examples of graphs and cycles in the graphs.
Figure 12B:
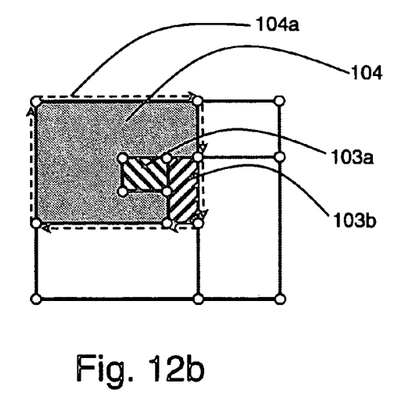

FIGS. 12a and 12b show graphs and cycles in the graphs. The graph is constituted by edges 100 and vertices 101. Each area enclosed by the edges 100 corresponds to a field in the original image as represented by the graph. FIG. 12a shows a shortest cycle 102 around a text area 105. FIG. 12b shows a further graph that has a further text area 104 enclosed by a rectangular shortest cycle 104a. The area 104 encloses a further, smaller text area 103a and a second smaller area 103b. The smaller areas 103a and 103B are also enclosed by shortest cycles. This situation may be handled in one of two alternative approaches.

In the first approach, the areas are sorted based on the size of their enclosed area before determining further properties of the fields like reading direction In particular the reading order in the smaller text block is determined first. During processing the larger shortest cycle, the area of the smaller cycle is skipped, such that characters in that area do not influence the determination of reading direction in the larger area.

In the second approach, the FIELD step S8 (FIG. 11) comprises detecting such inclusion and compensating for it. In a first sub-step it is determined if a larger shortest cycle includes a smaller shortest cycle. Comparing the enclosed areas and/or the location of the shortest cycles reveals the enclosure. For this purpose, shared edges or vertices may be used. In a second sub-step, the enclosed area of the smaller shortest cycle is subtracted from the enclosed area of the larger shortest cycle.

Shortest cycles can be detected in several ways, for example using the following algorithm.

Figure 13A:
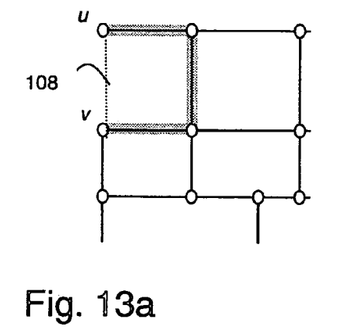
FIGS. 13a and 13b show shortest cycle detection according to an embodiment of the present invention.
Figure 13B:
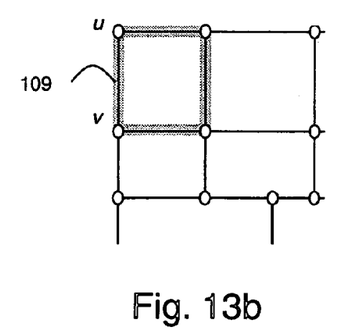

FIGS. 13a and 13b show an example of a shortest cycle detection. A method as shown is for finding a shortest cycle based on selecting a starting edge 108. In FIG. 13a, a graph is shown that is temporarily reduced by removing the starting edge 108 between the vertices u and v. Now a shortest path in the graph is constructed from the vertex u to the vertex v. FIG. 13b shows constructing the shortest cycle by resetting the edge 109. Hence the shortest cycle including the edge and vertices u and v is found. Suitable algorithms for constructing the shortest path between two vertices in a graph can be found in "Graph theory: an algorithmic approach" by N. Christofides, Academic Press, New York, 1975, in particular Dijkstra's algorithm described therein. By subsequently taking edges as starting point, a list of shortest cycles is constructed covering the total of the graph. In an embodiment, the construction of the list of shortest cycles comprises only including a shortest cycle on the list if that cycle is not already included in the list.

The amount of calculations can be drastically limited when a so-called graph reduction method is applied. According to this method, a shortest cycle that is detected is removed from the graph, and detecting shortest cycles is continued within the reduced until nothing remains of it.

Figure 14:
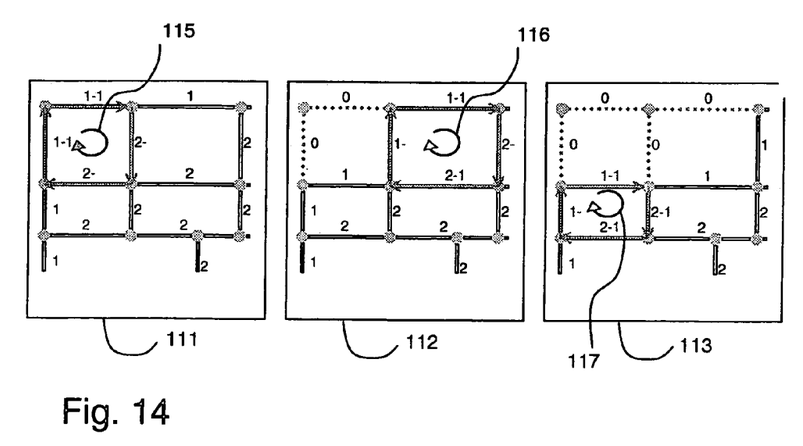
FIG. 14 shows the graph reduction method according to an embodiment of the present invention.

A suitable algorithm for constructing the list using the graph reduction is shown in FIG. 14. In a first step 111 of FIG. 14, each edge is assigned a potential number indicating the maximal number of shortest cycles it can be part of, normally 1 for an edge situated at an outer border of the graph and 2 for an edge situated within the graph borders. In the upper left area, a shortest cycle 115 is shown as detected. Once detected, the number of potential cycles of the 4 edges included in this shortest cycle is reduced by 1. In the second step 112, the upper left edges that have a potential number of 0, are removed from the graph. A second shortest cycle 116 is detected in the second area to the right, adjacent to the area of cycle 115. In a third step 113 again the potential numbers are reduced and two more sides are removed from the graph. A third shortest cycle 117 is detected on the second row left.

Every time a shortest cycle is detected, it is added to a list of shortest cycles for the image. The process of detecting a shortest cycle and reducing the graph continues until no edges are left. It is noted the dead ends in the graph are removed also, because they can never be part of a cycle.

In another embodiment of the present method, determining the shortest cycle is performed by constructing a minimal spanning tree. Such a minimal spanning tree represents all shortest paths from a root vertex to the other vertices. The root vertex u is the first vertex of the removed edge. The tree is used to find the shortest path to the other vertex v of the removed edge. A data structure of pointers is used to represent the minimal spanning tree. The tree is constructed by adding a vertex per iteration, which vertex has the shortest distance to the root vertex of all vertices not yet in the tree. The respective new vertex is found by checking the neighbors of all vertices that are already included in the tree and calculating the distance to the root if that neighbor is not yet in the tree. As soon as the vertex v is added to the tree, the process is stopped. Advantageously a separate list with the neighbors of the current iteration can be maintained The minimal spanning tree may also be represented in variables of the data structure that represents the graph, in particular associated with the vertex elements of the graph. Each vertex element has additional variables to store the tree. For finding a new shortest cycle, the variables must be initialized. In an embodiment, the variables are not individually initialized, but an additional variable is added to each vertex that is initialized before the first tree is constructed. For each subsequent tree, a different value is stored in the additional variable, identifying the respective vertex as being part of the current tree. Constructing the tree using variables in the graph is advantageous in that no separate data structure needs to be maintained for the minimal spanning tree.

Figure 10:
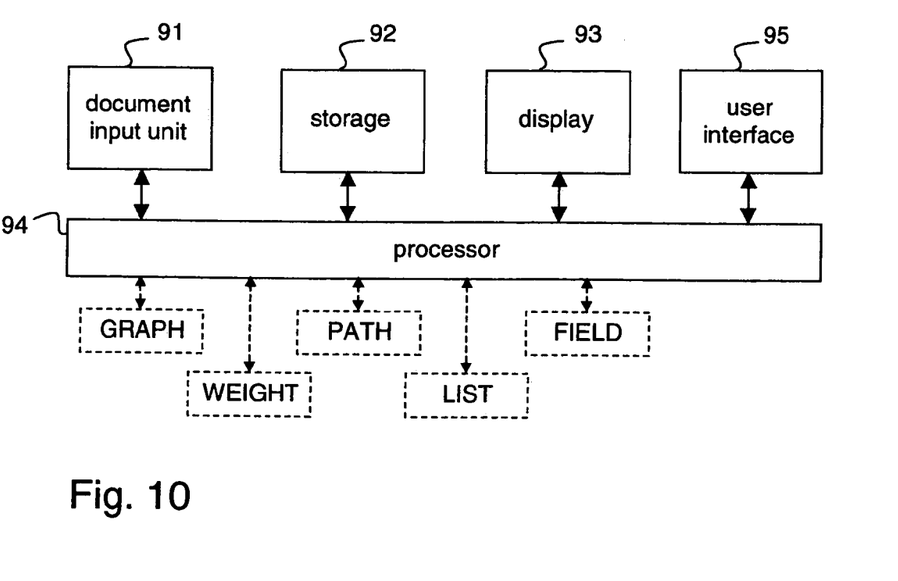
FIG. 10 shows a device for segmenting a picture according to an embodiment of the present invention.

FIG. 10 shows a device for segmenting a picture using the method according to the invention. Referring to FIG. 10, the device has an input unit 91 for entering a digital image. The input unit 91 may comprise a scanning unit for scanning an image from paper such as an electro-optical scanner, or a digital communication unit for receiving the image from a network like internet, or a playback unit for retrieving digital information from a record carrier like an optical disc drive. The input unit 91 is coupled to a processing unit 94, which cooperates with a memory unit 92. The processing unit 94 may comprise a general purpose computer central processing unit (CPU) and supporting circuits and operates using software for performing the segmentation as described above. Thereto it includes a GRAPH module for constructing a graph on the basis of background areas in the image, a WEIGHT module for assigning a weight to the edges of the graph, a PATH module for determining within the graph closed paths or cycles via the edges and determining shortest cycles therefrom, a LIST module for constructing a list of contiguous shortest cycles, and a FIELD module for defining the shortest cycles of the list as the fields of the image. It is to be understood that these modules may be implemented as program modules in the processing unit 94. Therefore, these modules have been drawn with broken lines in FIG. 10. The processing unit 94 may also include a user interface 95 provided with a controller such as a keyboard, a mouse device or operator buttons. The output of the processing unit 94 is coupled to a display unit 93. In an embodiment, the display unit 93 is a printing unit for outputting a processed image on paper, or a recording unit for storing the segmented image on a record carrier like a magnetic tape or optical disk.

As discussed above, the steps of the present method are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Although the invention has been mainly explained by embodiments using a Japanese newspaper page as the digital image to be segmented, the invention is also suitable for any digital representation of any text or image having a layout in fields on a background, such as electrical circuits in layout images for IC design or streets and buildings on city maps. Also for a very different application such as detecting closed sub-circuits in electric chains, this approach may be used. Further it is noted that the graph as starting point for executing the segmenting by shortest cycles may be constructed differently than the graph described above based on the MWR system. For example a graph may be constructed using tiles as described in the article by Antonacopoulos mentioned above, although the particular graph disclosed in Antonacopoulos is different from that of the present invention and cannot be used. Further the weight assigned to an edge in the graph is not necessarily the distance. It must be selected to correspond to a contribution to the shortest cycle, for example the weight may be the surface of the tile. It is noted, that in this document the use of the verb 'comprise' and its conjugations does not exclude the presence of other elements or steps than those listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of segmenting an image of pixels into a number of fields corresponding to lay-out elements of the image, the pixels having a value representing an intensity and/or color of a picture element, the method comprising:
   using a processor to perform the steps of:
   constructing a graph having vertices and edges connecting the vertices, on the based of background areas in the image, said graph edges corresponding to field separators that together delineate the fields of the image;
   constructing a list of contiguous shortest cycles that together completely cover at least apart of the image, a shortest cycle being defined as a closed path from a vertex back to that same vertex via the edges of the graph, that has the lowest sum of weights of edge of all possible closed paths from said vertex tack to said vertex; and
   defining the shortest cycles of the list as the fields of the image, wherein said step of defining comprises:
   determining an enclosed area for each shortest cycle in the list of shortest cycles, and
   sorting the list of shortest cycles based on the size of the enclosed area,
   wherein any further processing of the image is performed successively on fields corresponding to the shortest cycles in the order of the sorted list.

2. The method as claimed in claim 1, further comprising:
   assigning a weight to an edge in accordance with a predetermined property.

3. The method as claimed in claim 2, wherein the predetermined property is an Euclidean distance between the vertices of said edge.

4. The method as claimed in claim 1, wherein said step of constructing the list of shortest cycles comprises:
   selecting an edge that can be part of at most a single shortest cycle,
   determining the shortest path that connects the vertices of said edge alternative to said edge, and
   combining said edge and said shortest path.

5. The method as claimed in claim 4, wherein in the selecting step, the edge that can be part of at most a single shortest cycle is an edge at an outer border of the graph.

6. The method as claimed in claim 1, wherein said step of constructing the list of shortest cycles is an iterative process, wherein, after finding a shortest cycle, the graph is reduced by removing any edge that is part of that shortest cycle and that cannot be part of a further shortest cycle, and then a next shortest cycle is determined.

7. The method according to claim 6, wherein said step of constructing the list of shortest cycles is terminated when the graph does not have any remaining edges.

8. The method as claimed in claim 1, wherein the shortest cycle is determined by constructing a minimal spanning tree, which represents all shortest paths from a root vertex to the other vertices, and the minimal spanning tree is represented in variables associated with the vertices of the graph.

9. The method as claimed in claim 1, wherein said step of defining comprises:
checking if a first shortest cycle that encloses a first area completely includes a second shortest cycle that encloses a second area smaller than the first area, and
subtracting the second enclosed area from the first enclosed area.

10. The method as claimed in claim 1, further comprising:
a processing step wherein a reading order is detected for a field corresponding to any one of the shortest cycles, wherein foreground components within the field are joined to text lines in a direction corresponding to said reading order.

11. A computer-readable storage medium containing a computer program comprising computer-executable instructions for segmenting an image of pixels into a number of fields corresponding to lay-out elements of the image, the pixels having a value representing an intensity and/or color of a picture element, the computer program further comprising computer-executable instructions for:
constructing a graph having vertices and edges connecting the vertices, on the basis of background areas in the image, said graph edges corresponding to field separators that together delineate the fields of the image;
constructing a list of contiguous shortest cycles that together completely cover at least a part of the image, a shortest cycle being defined as a closed path from a vertex back to that same vertex via the edges of the graph, that has the lowest sum of weights of edges of all possible closed paths from said vertex back to said vertex; and
defining the shortest cycles of the list as the fields of the image, wherein said step of defining comprises:
determining an enclosed area for each shortest cycle in the list of shortest cycles, and
sorting the list of shortest cycles based on the size of the enclosed area,
wherein any further processing of the image is performed successively on fields corresponding to the shortest cycles in the order of the sorted list.

12. The computer-readable storage medium as claimed in claim 11, further comprising computer-executable instructions:
assigning a weight to an edge in accordance with a predetermined property.

13. The computer-readable storage medium as claimed in claim 11, wherein said computer-executable instructions for constructing the list of shortest cycles comprise computer-executable instructions for:
selecting an edge that can be part of at most a single shortest cycle,
determining the shortest path that connects the vertices of said edge alternative to said edge, and
combining said edge and said shortest path.

14. The computer-readable storage medium as claimed in claim 11, wherein, after finding a shortest cycle, the graph is reduced by removing any edge that is part of that shortest cycle and that cannot be part of a further shortest cycle, and then a next shortest cycle is determined.

15. The computer-readable storage medium as claimed in claim 11, wherein the shortest cycle is determined by constructing a minimal spanning tree, which represents all shortest paths from a root vertex to the other vertices, and the minimal spanning tree is represented in variables associated with the vertices of the graph.

16. The computer-readable storage medium as claimed in claim 11, further comprising computer-executable instructions for:
performing a processing step wherein a reading order is detected for a field corresponding to any one of the shortest cycles, wherein foreground components within the field are joined to text lines in a direction corresponding to said reading order.

17. A device for segmenting an image of pixels into a number of fields corresponding to lay-out elements of the image, the pixels having a value representing an intensity and/or color of a picture element, the device comprising:
an input unit for inputting an image; and
a processing unit including:
a graph constructor for constructing a graph including vertices and edges connecting the vertices, on the basis of background areas in the image, said graph edges corresponding to field separators that together delineate the fields of the image,
a pathfinding module for determining within the graph a closed path from a vertex back to that same vertex via the edges of the graph, that has the lowest sum of weights of edges of ail possible closed pats from said vertex back to said vertex,
a list module for constructing a list of contiguous shortest cycles that together completely cover at least a part of the image, and
a field definer for defining the shortest cycles of the list as the fields of the image, wherein said field definer is further configured to:
determine an enclosed area for each shortest cycle in the list of shortest cycles, and
sort the list of shortest cycles based on the size of the enclosed area,
wherein any further processing of the image is performed successively by the processing unit on contiguous fields corresponding to the shortest cycles in the order of the sorted list.

18. The device as claimed in claim 17, wherein the processing unit further comprises:
a weight assigner for assigning a weight to an edge in accordance with a predetermined property.

19. The device as claimed in claim 18, wherein the predetermined property is an Euclidean distance between the vertices of said edge.

20. The device as claimed in claim 17, further comprising:
a display unit for displaying fields of the image after segmenting.

21. The device as claimed in claim 17, wherein the list module is arranged for iteratively finding shortest cycles by removing any edge from the graph that is part of a shortest cycle to be included on the list and that cannot be part of a further shortest cycle, and terminating constructing the list when the graph does not have any remaining edges.

22. The device as claimed in claim 17, wherein the processing unit detects a reading order for a field corresponding to any one of the shortest cycles, and foreground components within the fields are joined to text lines in a direction corresponding to said reading order.

* * * * *